United States Patent
Aizawa et al.

(10) Patent No.: US 7,337,873 B2
(45) Date of Patent: Mar. 4, 2008

(54) STEERING CONTROL APPARATUS FOR A VEHICLE

(75) Inventors: Hiroaki Aizawa, Anjo (JP); Hiroaki Niino, Toyota (JP); Minekazu Momiyama, Chiryu (JP); Hiroaki Kato, Hekinan (JP)

(73) Assignees: Advics Co., Ltd., Kariya, Aichi Pref. (JP); Toyoda Koki Kabushiki Kaisha, Kariya, Aichi Pref. (JP)

( * ) Notice: Subject to any disclaimer, the term of this patent is extended or adjusted under 35 U.S.C. 154(b) by 519 days.

(21) Appl. No.: 11/067,720

(22) Filed: Mar. 1, 2005

(65) Prior Publication Data

US 2005/0205346 A1 Sep. 22, 2005

(30) Foreign Application Priority Data

Mar. 2, 2004 (JP) .............................. 2004-057806

(51) Int. Cl.
*B62D 6/00* (2006.01)
(52) U.S. Cl. .................. 180/446; 180/421; 701/72
(58) Field of Classification Search ................ 180/421, 180/443, 444, 445, 446; 701/70–73, 78, 701/80
See application file for complete search history.

(56) References Cited

U.S. PATENT DOCUMENTS

| 6,062,336 A * | 5/2000 | Amberkar et al. .......... 180/443 |
| 6,447,076 B1 | 9/2002 | Ito et al. |
| 7,073,621 B2 * | 7/2006 | Koibuchi et al. ........... 180/421 |
| 2002/0013646 A1 | 1/2002 | Nishizaki et al. |

FOREIGN PATENT DOCUMENTS

| JP | 2000-108863 | 4/2000 |
| JP | 2001-334947 | 12/2001 |

* cited by examiner

*Primary Examiner*—Lesley D. Morris
*Assistant Examiner*—Marc A. Scharich (57) ABSTRACT

A steering control apparatus is provided for controlling a steered wheel angle of a wheel to be steered. On the basis of a road coefficient of friction estimated between right and left wheels, a braking force difference between the right and left wheels is calculated. A slip angle—total lateral force characteristic indicative of a relationship between a slip angle and a total lateral force of a wheel to be steered is provided on the basis of the estimated coefficient of friction. Then, a steered wheel angle of the wheel to be steered is set on the basis of the braking force difference and the slip angle—total lateral force characteristic.

11 Claims, 9 Drawing Sheets

STEERING CONTROL APPARATUS FOR A VEHICLE

This application claims priority under 35 U.S.C. Sec. 119 to No. 2004-057806 filed in Japan on Mar. 2, 2004, the entire content of which is herein incorporated by reference.

BACKGROUND OF THE INVENTION

1. Field of the Invention

The present invention relates to a steering control apparatus for a vehicle, particularly relates to an apparatus for controlling a steered wheel angle (tire angle) of a wheel to be steered, or applying a steering torque thereto, in response to steering operation of a vehicle driver, with respect to front or rear wheels of the vehicle to be steered.

2. Description of the Related Arts

In the United States Publication No. US2002/0013646 A1 (corresponding to Japanese Patent Laid-open Publication No. 2001-334947), for example, there is disclosed a motor vehicle steering system which is capable of controlling the attitude of a motor vehicle by controlling a steering mechanism. It is described in the Publication that in response to the detection of the actuation of the braking mechanism, the steering control circuit additionally turns the steerable wheels of the motor vehicle by a control steering angle toward one of the left and right wheels having a lower wheel speed on the basis of a result of judgement by the speed comparing circuit on condition that the speed difference between the left and right wheels exceeds the predetermined threshold value. With respect to a so-called "μ-split road", it is explained that a road having significantly different friction coefficients with respect to left and right wheels of the motor vehicle. In that publication, the speed difference between the left and right wheels is employed as a reference for judging the "μ-split road". And, a method for estimating a coefficient of friction of a road surface is described in the U.S. Pat. No. 6,447,076 B1 (corresponding to Japanese Patent Laid-open Publication No. 2000-108863).

According to the system as disclosed in the United States Publication No. US2002/0013646, it is so controlled that when the braking operation is performed on the μ-split road, the yaw moment acting on the motor vehicle at the initial stage of the braking operation is suppressed with a satisfactory responsiveness by the addition of the predetermined control steering angle for turning the front wheels toward the lower-speed wheel. In other words, by performing a so-called counter-steer control, the controlled yaw moment is applied in a reverse direction to the vehicle, to achieve a stability control of the vehicle. Although it is also described that the control angle can be set to be varied in response to braking force difference between the right and left wheels, the Publication No. US2002/0013646 is silent about its practical example.

As described above, in the case where the vehicle is running on a road surface with different coefficients of friction, with a pair of (right and left) wheels to be steered being positioned on the surface of different coefficients of friction from each other, respectively, if a braking operation is performed to each wheel to perform a so-called "μ-cross over braking", it is required to perform an action properly reflecting the road surface condition. According to the system as disclosed in the United States Publication No. US2002/0013646, however, nothing has been evaluated about such a state as explained hereinafter.

In general, if lateral force is applied to the wheel to be steered, its slip angle can be obtained. According to the prior system, a μ-split road (D1) with a wet road surface having the coefficient of friction (μ) of 0.8, and an iced road surface having the coefficient of friction (μ) of 0.1, provides a difference of coefficient of friction (μ=0.7) between the split road surfaces. Also, a μ-split road (D2) with a dry road surface having the coefficient of friction (μ) of 1.0, and a pressed snow road surface having the coefficient of friction (μ) of 0.3, provides the same difference of coefficient of friction (μ=0.7) between the split road surfaces, as the one for the μ-split road (D1). Therefore, in the case where the road surface is determined only on the basis of the difference of braking force, i.e., it is determined by simply relying on the difference of coefficient of friction (μ), then, what type of the μ-split road can not be identified, as described later in detail with reference to FIG. 4. Therefore, even if the same lateral force was applied to the wheel, there would be caused a pretty large difference of the slip angle, which has resulted in one of the reasons for making an appropriate steering control operation to be difficult.

SUMMARY OF THE INVENTION

Accordingly, it is an object of the present invention to provide a steering control apparatus capable of maintaining an appropriate stability of a vehicle, even in the case where the vehicle is running on a road surface with different coefficients of friction, with right and left wheels to be steered being positioned on the surface of different coefficients of friction form each other, respectively, and a braking operation is performed to the vehicle.

In accomplishing the above object, the steering control apparatus includes a steering control device or actuator for controlling a steered wheel angle of a wheel to be steered in response to steering operation of a vehicle driver, a braking force estimation device for estimating a braking force applied to at least a pair of right and left wheels of the vehicle, respectively, a coefficient of friction estimation device for estimating a coefficient of friction of road surface, on which each of the right and left wheels is placed, and a braking force difference calculation device for calculating a braking force difference between the braking force applied to the right wheel and the braking force applied to the left wheel, on the basis of the braking force estimated by the braking force estimation device. A slip angle—total lateral force characteristic setting device is provided for setting a relationship between a slip angle of the wheel to be steered, and a total lateral force of the wheel to be steered, on the basis of the coefficient of friction estimated by the coefficient of friction estimation device. And, a steered wheel angle setting device is provided for setting the steered wheel angle of the wheel to be steered, on the basis of the braking force difference between the right and left wheels calculated by the calculation device, and the relationship between the slip angle of the wheel to be steered and the total lateral force of the wheel to be steered, which relationship is set by the characteristic setting device.

In the steering control apparatus as described above, the characteristic setting device is preferably adapted to estimate a relationship between the slip angle and the lateral force for each wheel of the right and left wheels, which are placed on the road surface with the coefficient of friction estimated by the coefficient of friction estimation device, on the basis of a relationship between the slip angle and the lateral force for each wheel of the right and left wheels, which are placed on a road surface with a certain coefficient of friction, and add the result estimated for the right and left wheels, to provide the relationship between the slip angle and the total lateral force of the wheel to be steered.

The steered wheel angle setting device is preferably adapted to calculate the total lateral force of the wheel to be steered, which is required for canceling a moment about a gravity center of the vehicle. The moment is caused by the braking force difference calculated by the braking force difference calculation device. And, the steered wheel angle setting device is preferably adapted to apply the calculated total lateral force to the relationship between the slip angle of the wheel to be steered and the total lateral force of the wheel to be steered, to obtain a slip angle, which is provided as the steered wheel angle of the wheel to be steered. Or, the steered wheel angle setting device may be adapted to apply the calculated total lateral force to the relationship between the slip angle of the wheel to be steered and the total lateral force of the wheel to be steered, to obtain a dynamic relationship among the slip angle, vehicle slip angle, vehicle speed and yaw rate. And, the steered wheel angle setting device is adapted to calculate the steered wheel angle on the basis of the dynamic relationship.

Or, the steering control apparatus may include a steering torque applying device for applying a steering torque to a wheel to be steered in response to steering operation of a vehicle driver, a braking force estimation device for estimating braking force applied to at least a pair of right and left wheels of the vehicle, respectively, a coefficient of friction estimation device for estimating a coefficient of friction of road surface, on which each of the right and left wheels is placed, and a braking force difference calculation device for calculating a braking force difference between the braking force applied to the right wheel and the braking force applied to the left wheel, on the basis of the braking force estimated by the braking force estimation device. A slip angle—total lateral force characteristic setting device is provided for setting a relationship between a slip angle of the wheel to be steered, and a total lateral force of the wheel to be steered, on the basis of the coefficient of friction estimated by the coefficient of friction estimation device. And, a steering torque setting device is provided for setting the steering torque of the wheel to be steered, on the basis of the braking force difference between the right and left wheels calculated by the calculation device, and the relationship between the slip angle of the wheel to be steered and the total lateral force of the wheel to be steered, which relationship is set by the characteristic setting device.

In the steering control apparatus as described above, the steering torque setting device is preferably adapted to calculate the total lateral force of the wheel to be steered, which is required for canceling a moment about a gravity center of the vehicle. The moment is caused by the braking force difference calculated by the braking force difference calculation device. And, the steered wheel angle setting device is preferably adapted to apply the calculated total lateral force to the relationship between the slip angle of the wheel to be steered and the total lateral force of the wheel to be steered, to obtain a slip angle, which is multiplied by a proportional coefficient to provide the steering torque for the wheel to be steered.

The steering torque setting device may be adapted to calculate the total lateral force of the wheel to be steered, which is required for canceling a moment about a gravity center of the vehicle. The moment is caused by the braking force difference calculated by the braking force difference calculation device. And, the steered wheel angle setting device may be adapted to apply the calculated total lateral force to the relationship between the slip angle of the wheel to be steered and the total lateral force of the wheel to be steered, to obtain a dynamic relationship among the wheel slip angle, vehicle slip angle, vehicle speed and yaw rate, and the steering torque setting device may be adapted to calculate the steered wheel angle on the basis of the dynamic relationship, and multiply the steered wheel angle by a proportional coefficient to provide the steering torque of the wheel to be steered.

In the steering control apparatuses as described above, if the required total lateral force of the wheel to be steered exceeds saturated lateral force corresponding to the slip angle in the relationship between the slip angle of the wheel to be steered and the total lateral force of the wheel to be steered, the slip angle corresponding to the saturated lateral force may be set as a desired slip angle provided to be used.

BRIEF DESCRIPTION OF THE DRAWINGS

The above stated object and following description will become readily apparent with reference to the accompanying drawings, wherein like referenced numerals denote like elements, and in which.

DESCRIPTION OF THE PREFERRED EMBODIMENTS

Figure 1:
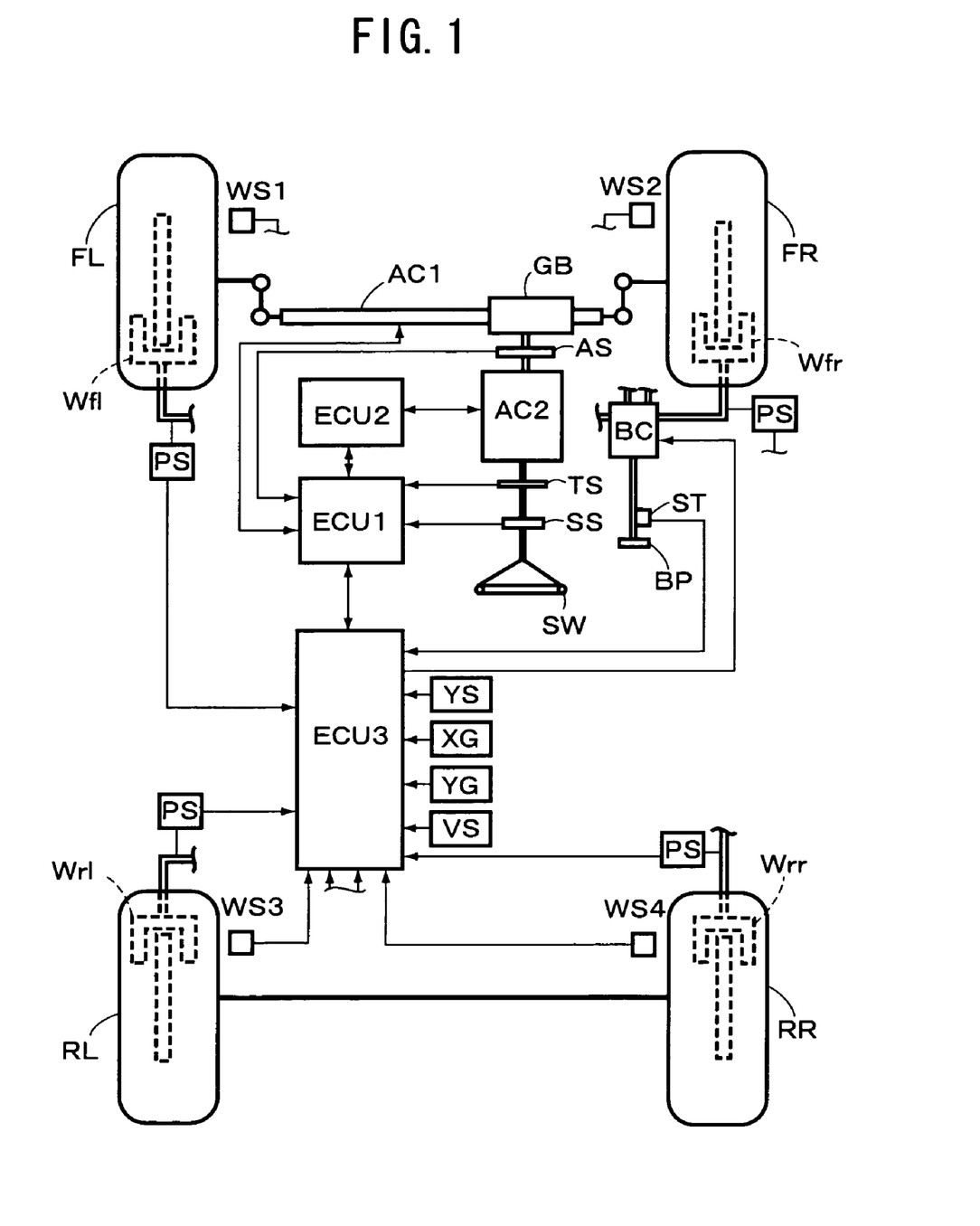
FIG. 1 is a schematic block diagram showing a steering control apparatus according to an embodiment of the present invention.

Referring to FIG. 1, there is schematically illustrated a block diagram of a steering control apparatus according to an embodiment of the present invention. FIG. 1 illustrates an overall structure of the vehicle including the steering control apparatus, wherein a steering system includes an electric power steering system, an active steering system and a variable transmitting ratio control system. According to the electric power steering system, an actuator is controlled in response to steering operation of the vehicle driver, to steer wheels to be steered, thereby to reduce steering force required for the steering operation by the vehicle driver. In the active steering system, the steered wheel angle (tire angle) of a wheel to be steered (hereinafter, referred to as steered wheel) is controlled freely in response to steering operation of the vehicle driver, so that an active steering control for increasing or decreasing the steered wheel angle (tire angle) to the steering operation angle (steering angle, or handle angle) can be achieved. And, according to the variable transmitting ratio control system, there is disposed a variable transmitting ratio device in a steering operation transmitting system for connecting a steering wheel and the steered wheel, to make the transmitting ratio to be variable.

As shown in FIG. 1, between the right and left front wheels FL and FR to be steered, there is disposed an actuator AC1 for performing a power steering control, which is controlled by a steering control unit ECU1. And, an actuator AC2 for performing a variable transmitting ratio control is connected to a steering wheel SW, and provided with a steering angle sensor SS for detecting a steering angle (or, handle angle) of the steering wheel SW, a steering torque sensor TS for detecting a steering torque of the steering wheel SW, and an output angle sensor AS for detecting an output of the actuator AC2. The actuator AC2 is connected to the actuator AC1 through a steering gear box GB, and controlled by a variable transmitting ratio control unit ECU2, which can be communicated with the steering control unit ECU1 by sending and receiving bidirectional signals. The components as described above are connected as shown in FIG. 2, and each unit will be explained later in detail.

Next, with respect to a braking system according to the present embodiment, wheel brake cylinders Wfl, Wfr, Wrl, Wrr are operatively associated with the wheels FL, FR, RL, RR of the vehicle, respectively, and which are fluidly connected to the hydraulic braking pressure control device BC. This device BC includes a plurality of solenoid valves and an automatic hydraulic pressure generating source, e.g., pressure pump or the like, to provide a hydraulic pressure circuit which can be pressurized automatically. As the device BC is the same as an ordinary device, and the present embodiment is not characterized in a specific hydraulic braking pressure control, a drawing and explanation thereof are omitted herein. In FIG. 1, the wheel FL designates the wheel at the front left side as viewed from the position of a driver's seat, the wheel FR designates the wheel at the front right side, the wheel RL designates the wheel at the rear left side, and the wheel RR designates the wheel at the rear right side.

As shown in FIG. 1, in the vicinity of the wheels FL, FR, RL and RR, there are provided wheel speed sensors WS1 to WS4 respectively, which are connected to a brake control unit ECU3, and by which a signal having pulses proportional to a rotational speed of each wheel, i.e., a wheel speed signal is fed to the brake control unit ECU3. Also, a vehicle speed sensor VS is provided for detecting a vehicle speed, which may be differentiated to provide a vehicle deceleration. Instead, the vehicle speed may be estimated on the basis of the wheel speed which is detected by a wheel speed sensor (not shown) disposed in the vicinity of each wheel. There are also provided a stop switch ST which turns on when the brake pedal BP is depressed, and turns off when the brake pedal BP is released, a longitudinal acceleration sensor XG for detecting a vehicle longitudinal acceleration Gx, a lateral acceleration sensor YG for detecting a vehicle lateral acceleration Gy, a yaw rate sensor YS for detecting a yaw rate ($\gamma$) of the vehicle and so on. These are electrically connected to the brake control unit ECU3.

Figure 2:
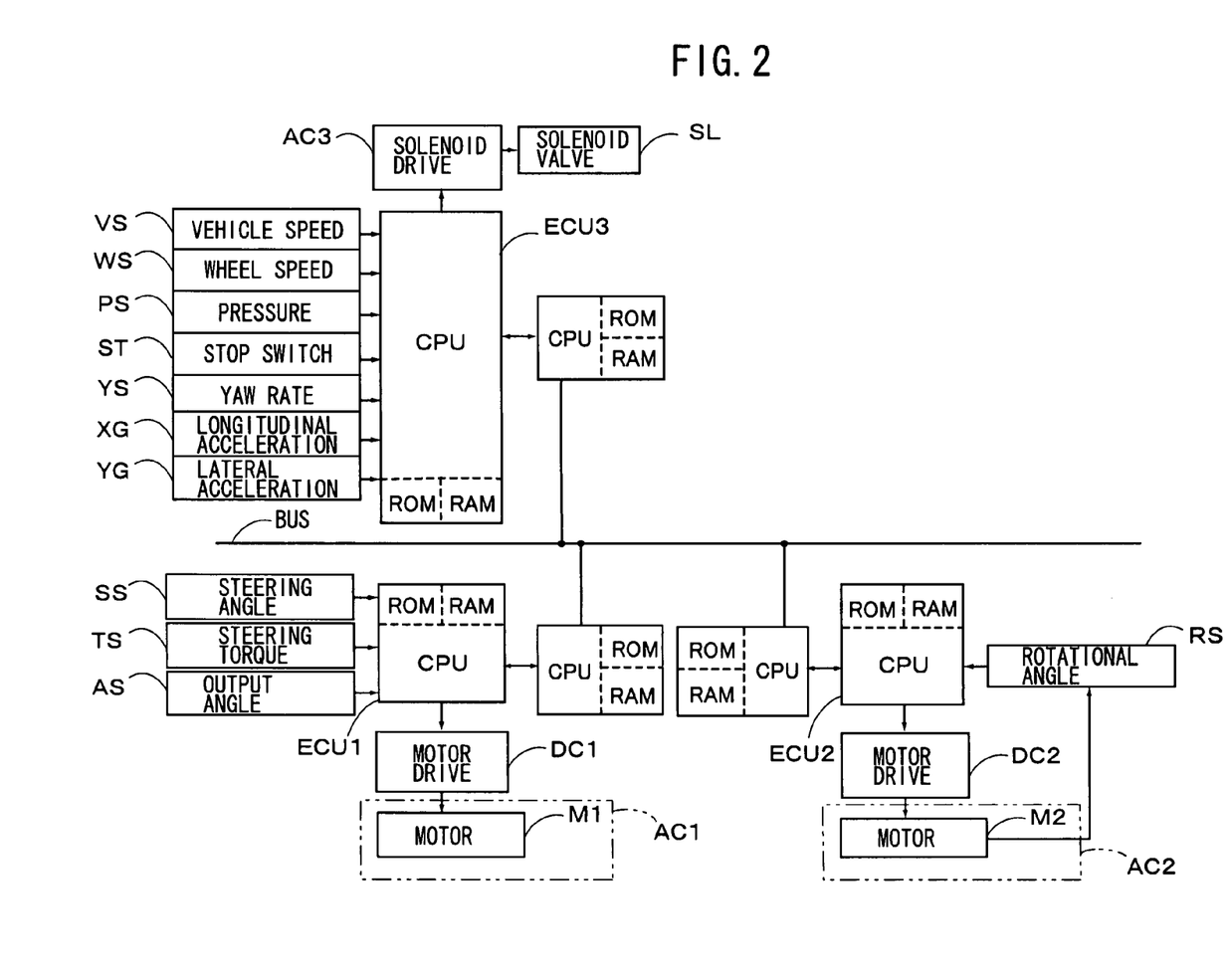
FIG. 2 is a block diagram showing an embodiment of a steering control system according to an embodiment of the present invention.

FIG. 2 shows an overall system of the present invention, wherein the steering control system, variable transmitting ratio control system and braking control system are connected with each other through the communication bus, so that each system may hold each information commonly. The steering control system includes the steering control unit ECU1 which is provided with CPU, ROM and RAM for the electric steering control, and to which the steering angle sensor SS, steering torque sensor TS and output angle sensor AS are connected, and also an electric motor M1 is connected through a motor drive circuit DC1. The variable transmitting ratio control system includes the variable transmitting ratio control unit ECU2 which is provided with CPU, ROM and RAM for the variable transmitting ratio control, and to which an electric motor M2 is connected through a motor drive circuit DC2. The electric motor M2 is provided with a rotational angle sensor RS for detecting a rotational (turning) angle of the motor M2, and connected to feed a rotational angle signal into the variable transmitting ratio control unit ECU2. And, the braking control system is adapted to perform the anti-skid control (ABS) or the like, and includes the braking control unit ECU3 which is provided with CPU, ROM and RAM for the braking control, and to which a vehicle speed sensor VS, the wheel speed sensors WS, hydraulic pressure sensors PS, stop switch ST, yaw rate sensor YS, longitudinal acceleration sensor XG, and lateral acceleration sensor YG are connected, and also solenoid valves SL are connected through a solenoid drive circuit AC3. Those control units ECU1-ECU3 are connected to the communication bus through a communication unit provided with CPU, ROM and RAM for the communication, respectively. Accordingly, the information required for each control system can be transmitted by other control systems.

Figure 3:
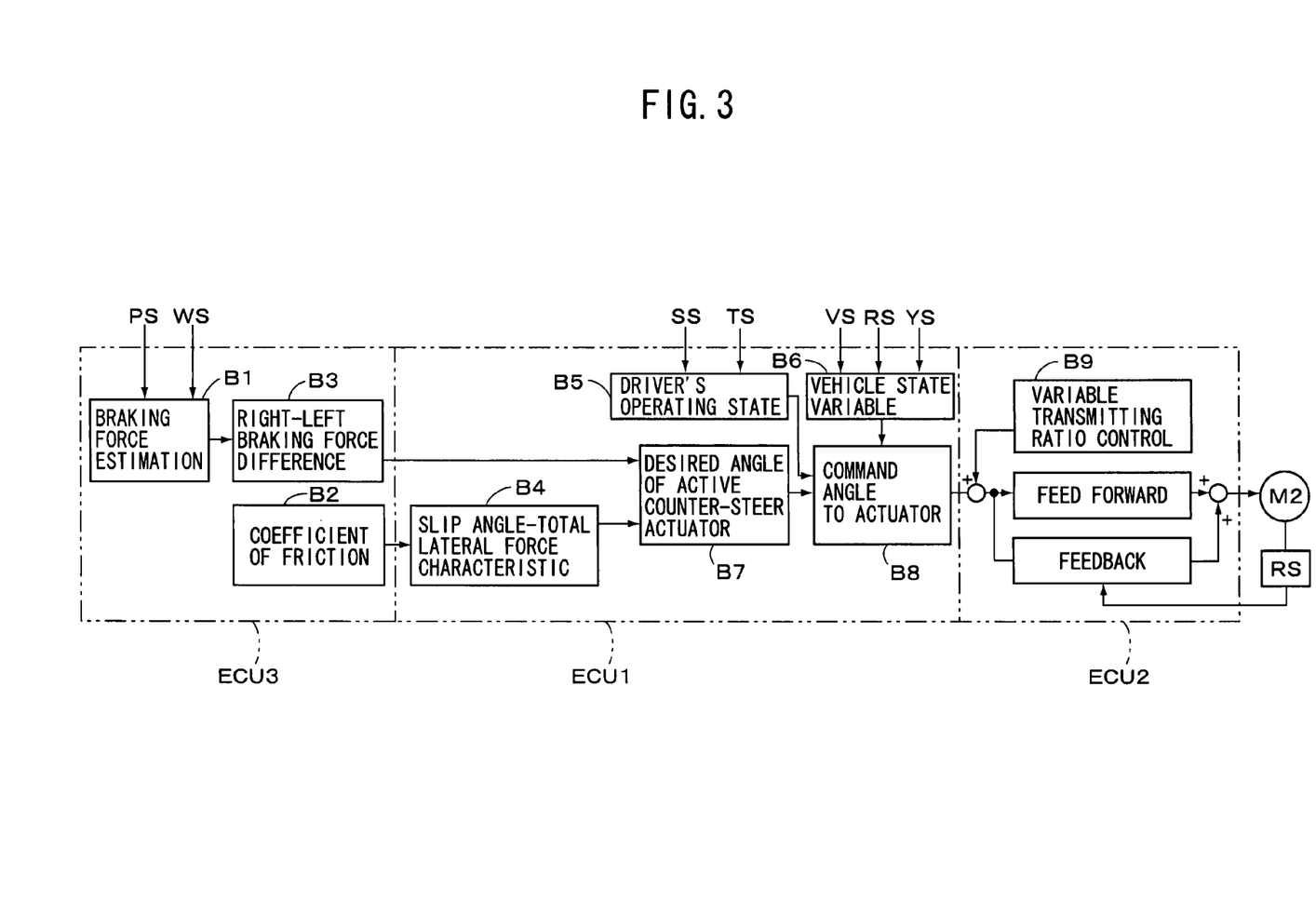
FIG. 3 is a block diagram showing an embodiment of a steering control system including an active counter-steer control according to an embodiment of the present invention.

The control units ECU1-ECU3 as described above are provided with a control block as shown in FIG. 3. At the outset, the braking control unit ECU3 includes a braking force estimation block (B1) for estimating a braking force applied to each wheel, a coefficient of friction estimation block (B2) for estimating a coefficient of friction of road surface, on which each wheel is placed, and a braking force difference calculation block (B3) for calculating a braking force difference between the braking force applied to the right wheel FR and the braking force applied to the left wheel FL. And, the steering control unit ECU1 includes a driver's operating state calculation block (B5) and vehicle state variable estimation block (B6). On the basis of the results of calculation by those blocks (B5) and (B6), an actuating angle for actuating the actuator AC2 is calculated at an actuator command angle calculation block (B8). The driver's operating state calculation block (B5) is connected with the steering angle sensor SS and steering torque sensor TS. The vehicle state variable estimation block (B6) is connected with the vehicle speed sensor VS, rotational angle sensor RS, yaw rate sensor YS or the like. Furthermore, in the steering control unit ECU1, a slip angle—total lateral force characteristic setting block (B4) is provided for setting a relationship between a slip angle of the wheels FL and FR to be steered, and lateral force of the wheels FL and FR, on the basis of the coefficient of friction estimated by the coefficient of friction estimation block (B2). And, an actuator desired angle setting block (B7) is provided for setting a desired angle to the actuator for the active counter-steer control, on the basis of the braking force difference between the right and left wheels FR and FL calculated at the calculation block (B3), and the relationship between the slip angle of the wheels FR and FL and the total lateral force of the wheels FR and FL. At the actuator command angle calculation block (B8), calculated is a command value of angle for actuating the actuator AC2 to perform the counter-steer. Then, according to the variable transmitting ratio control unit ECU2, a command value provided at a variable transmitting ratio control block (B9) is added to the command value provided at the actuator command angle calculation block (B8) as described before. In response to the added result, the feed forward control and feed back control are performed for controlling the electric motor M2, the detailed explanation of which is omitted herein, because the variable transmitting ratio control is not directly related to the present invention.

According to the braking force estimation block (B1), the braking force applied to each wheel can be obtained on the basis of the wheel cylinder pressure detected by the pressure sensor P and the wheel acceleration obtained by differentiating the result detected by the wheel speed sensor WS. The wheel cylinder pressure may be detected directly by the pressure sensor P, or may be estimated on the basis of the controlling amount and increasing or decreasing controlling time for the brake actuator. Also, in the case where the hydraulic brake apparatus is not employed, and a regenerative braking control is employed, for example, the braking force can be estimated on the basis of the controlling amount. The braking force difference between the right and left wheels calculated at the calculation block (B3) may be only the difference between the right and left wheels FR and FL, but calculated from all of the wheels. In the coefficient of friction estimation block (B2), the coefficient of friction may be estimated for the anti-skid control, on the basis of a locking pressure corresponding to the wheel cylinder pressure which is provided when the wheel is locked. Or, the coefficient of friction may be estimated through luminous reflection, or road noise or the like. When it is estimated on the basis of the locking pressure, it may be estimated only with respect to the right and left wheels FR and FL to be steered, or it may be obtained by estimating the coefficient of frictions for all of the wheels, and then obtaining an average between the coefficient of frictions for the right and left wheels, respectively. In the case where the coefficient of friction ($\mu$) is set as 1.0 for the wheel which is not locked, and the pressure for the locked wheel on the road surface with the coefficient of friction ($\mu$) of 1.0 ($\mu$=1.0) is 10 MPa, for example, if the wheel is locked, with the pressure of 5 MPa applied to it, then the coefficient of friction ($\mu$) is estimated to be 0.5 ($\mu$=0.5). In the case where the wheel is not locked, however, the coefficient of friction ($\mu$) is estimated to be larger than the one estimated if it was locked, while it is estimated to be equal to or smaller than 1.0.

The relationship between the slip angle ($\alpha$) and total lateral force (Fy) with respect to the wheels to be steered (i.e., steered wheels) may be obtained by adding the relationship between the slip angle and lateral force obtained on the basis of the coefficient of friction ($\mu$) for each wheel of them. The slip angle ($\alpha$) for the steered wheels is obtained by a function (f$\alpha$) of the total lateral force (Fy), i.e., $\alpha$=f$\alpha$(Fy), so that the relationship between the slip angle and lateral force for each wheel is set in advance as its tire characteristic on a specific road coefficient of friction ($\mu$).

Then, the total lateral force (Fy) required for the steered wheels may be obtained according to the following equation (1) which shows a balance between the difference (Fd) between the braking force applied to the right wheel and the braking force applied to the left wheel, and the moment about the gravity center of the vehicle:

$$Fy \cdot Lf = Fd \cdot D \quad (1)$$

where "Lf" is a distance between the gravity center and the front axle, and "D" is ½ of width of a tread.

Figure 4:
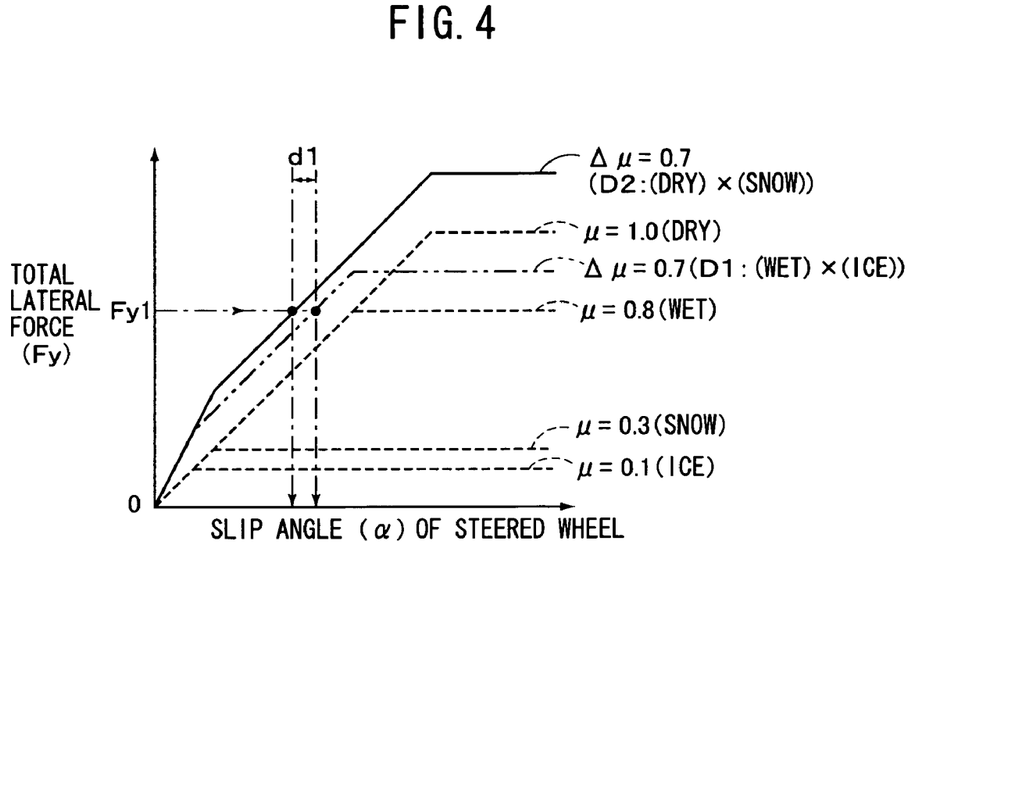
FIG. 4 is a diagram showing a relationship between slip angle and total lateral force of a steered wheel, in accordance with a road condition, according to an embodiment of the present invention.

As shown in FIG. 4, therefore, if the total lateral force (Fy1) is given for example, the slip angle ($\alpha$) for the steered wheels. In contrast, according to the prior apparatus, a $\mu$-split road (D1) with a wet road surface having the coefficient of friction ($\mu$) of 0.8, and an iced road surface having the coefficient of friction ($\mu$) of 0.1, provides a difference of coefficient of friction ($\mu$=0.7) between the split road surfaces, as indicated by a broken line. Also, a $\mu$-split road (D2) with a dry road surface having the coefficient of friction ($\mu$) of 1.0, and a pressed snow road surface having the coefficient of friction ($\mu$) of 0.3, provides the same difference of coefficient of friction ($\mu$=0.7, indicated by a solid line) between the split road surfaces, as the one for the $\mu$-split road (D1). Therefore, in case of simply relying on the difference of coefficient of friction ($\mu$), i.e., in the case where the road surface is determined only on the basis of the difference of braking force, the $\mu$-split road can not be identified which of them. Therefore, even if the same lateral force (Fy1) was applied to the wheel, there would be caused a difference "d1" of the slip angle ($\alpha$).

Figure 5:
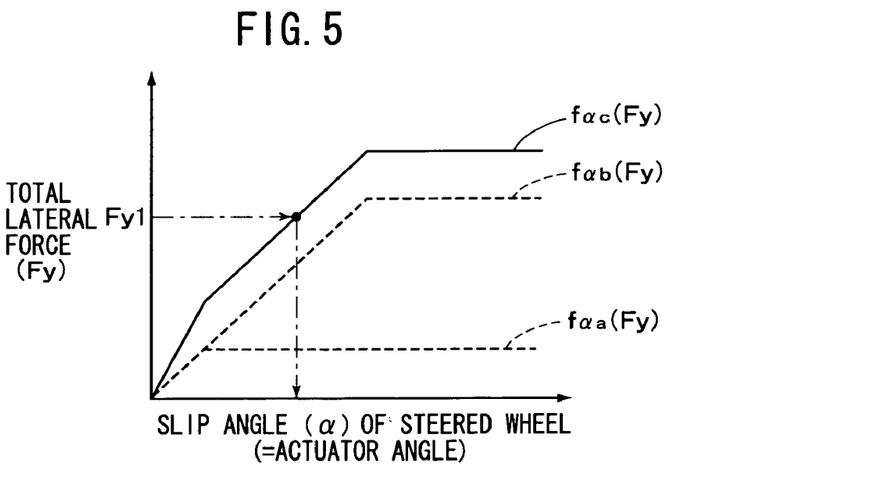
FIG. 5 is a diagram showing an example for obtaining a slip angle of a steered wheel, during a μ-cross over braking operation, according to an embodiment of the present invention.

According to the present embodiment, the $\mu$-split road (D1) and $\mu$-split road (D2) are distinguished from each other on the basis of their coefficients of friction, so that the slip angle ($\alpha$) of the steered wheels can be obtained. For example, with respect to the $\mu$-split road having a property f$\alpha$a(Fy) of one of the right and left wheels and a property f$\alpha$b(Fy) of the other one of them, as shown in FIG. 5, those properties are added together, to provide a map of specific property f$\alpha$c(Fy), on the basis of which the slip angle ($\alpha$) of the steered wheels can be obtained. According to the present embodiment, therefore, a desired angle ($\theta_1$) of steered wheel provided on the basis of the final difference of braking force calculated at the actuator desired angle setting block (B7) as shown in FIG. 3, can be obtained according to the following equation (2), to be approximately equal to the slip angle in the property f$\alpha$c(Fy) as shown in FIG. 5:

$$\theta_1 = f\alpha c(Fy) \quad (2)$$

According to the equation (2), a practical embodiment is provided for the aforementioned embodiment for calculating the total lateral force (Fy) required for the steered wheels to cancel the moment about the gravity center of the vehicle, and the slip angle obtained by applying the total lateral force (Fy) to the relationship (f$\alpha$c(Fy)) between the slip angle and the total lateral force for the steered wheels, is set to be the desired angle ($\theta_1$).

In the case where a vehicle slip angle ($\beta$) is known, on the basis of a dynamic relationship, the desired angle ($\theta_1$) of steered wheel may be obtained according to equations (3) and (4) as follows:

$$\theta_1 = \beta + \tan^{-1}\{\alpha/V \cdot (\gamma \cdot \cos \beta)\} - \alpha \quad (3)$$

where "V" is a vehicle speed and "$\gamma$" is yaw rate.

$$\alpha = f\alpha c(Fy) \quad (4)$$

If the required total lateral force is larger than the one defined in the relationship, the slip angle (α) for its maximal value, i.e., the saturated value of the lateral force, is employed.

According to the equation (3) including the vehicle slip angle (β), therefore, a practical embodiment is provided for the aforementioned embodiment for calculating the total lateral force required for the steered wheels to cancel the moment about the gravity center of the vehicle, and the steered wheel angle is calculated on the basis of the dynamic relationship among the wheel slip angle, vehicle slip angle, vehicle speed and yaw rate obtained by applying the total lateral force to the relationship between the slip angle and the total lateral force for the steered wheels.

Figure 6:
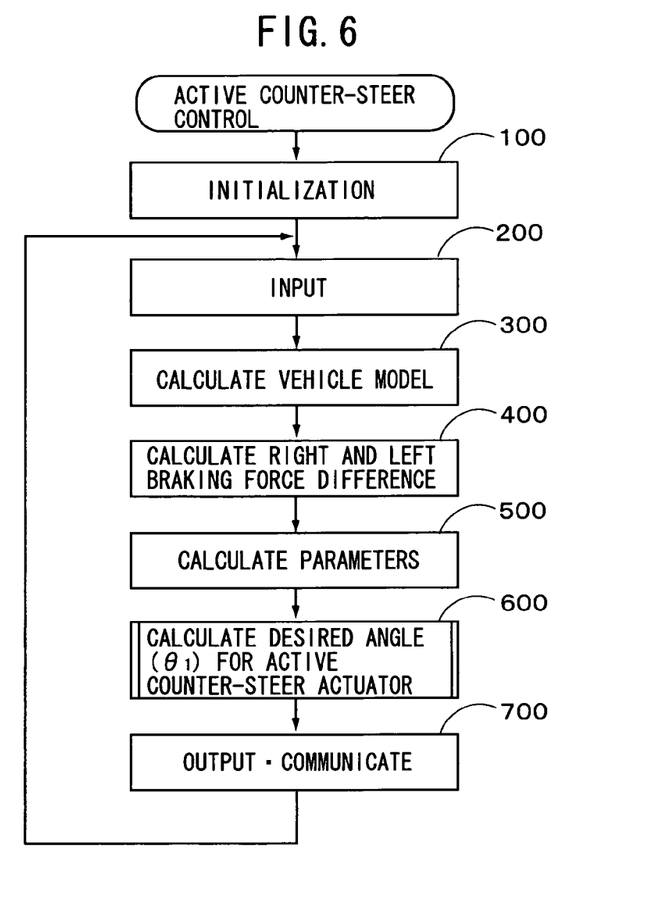
FIG. 6 is a flowchart showing operation of active counter-steer control according to an embodiment of the present invention.
Figure 7:
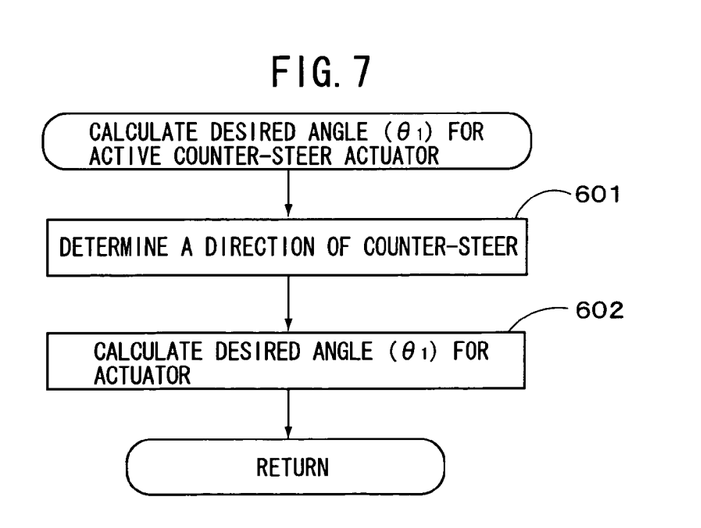
FIG. 7 is a flowchart showing operation of calculating a desired angle of steered wheel for an actuator at the time of an active counter-steer control according to an embodiment of the present invention.

The steering control apparatus as constituted above is actuated to perform the active counter control in response to braking operation, when the vehicle is running on the μ-split road, for example, according to flowcharts as shown in FIGS. 6 and 7. At the outset, with respect to the steering control, the program provides for initialization of the system at Step 100, and the sensor signals are input and the steered wheel angle, vehicle speed, longitudinal acceleration, lateral acceleration, yaw rate or the like are read at Step 200, and various data calculated by the braking control unit ECU3 are read as well, through the communication signals. Then, the program proceeds to Step 300 where a vehicle model is calculated, while its explanation is omitted herein. Next, at Step 400, calculated is the braking force-difference between the braking force applied to the right wheel FR and the braking force applied to the left wheel FL. Then, after various parameters are calculated at Step 500, the program proceeds to Step 600 where the desired angle ($\theta_1$) of steered wheel is calculated for the actuator AC2 to perform the active counter-steer control. Consequently, the program proceeds to Step 700 where output process is made, and the information transmitting process is made.

FIG. 7 shows the calculation of the desired angle ($\theta_1$) of steered wheel for the actuator AC2 to perform the active counter-steer control performed at Step 600, wherein a counter-steer direction is determined at Step 601, on the basis of the output detected by the steering angle sensor SS. For example, provided that a neutral position of the sensor SS is set to be zero (0), a left turn is determined when the steering angle is of positive value, whereas a right turn is determined when the steering angle is of negative value. And, at Step 602, the desired angle ($\theta_1$) of steered wheel for the actuator AC2 is obtained according to the equation of [$\theta_1$=fαc(Fy)], as described before. That is, the desired angle ($\theta_1$) of steered wheel according to the present embodiment is appropriately calculated not only on the basis of the braking force difference between the right and left wheels (or, coefficient of friction difference), but also on the basis of the property of fαc(Fy) which reflects the relationship of the braking force actually applied to each wheel (or, coefficient of friction to each wheel).

Figure 8:
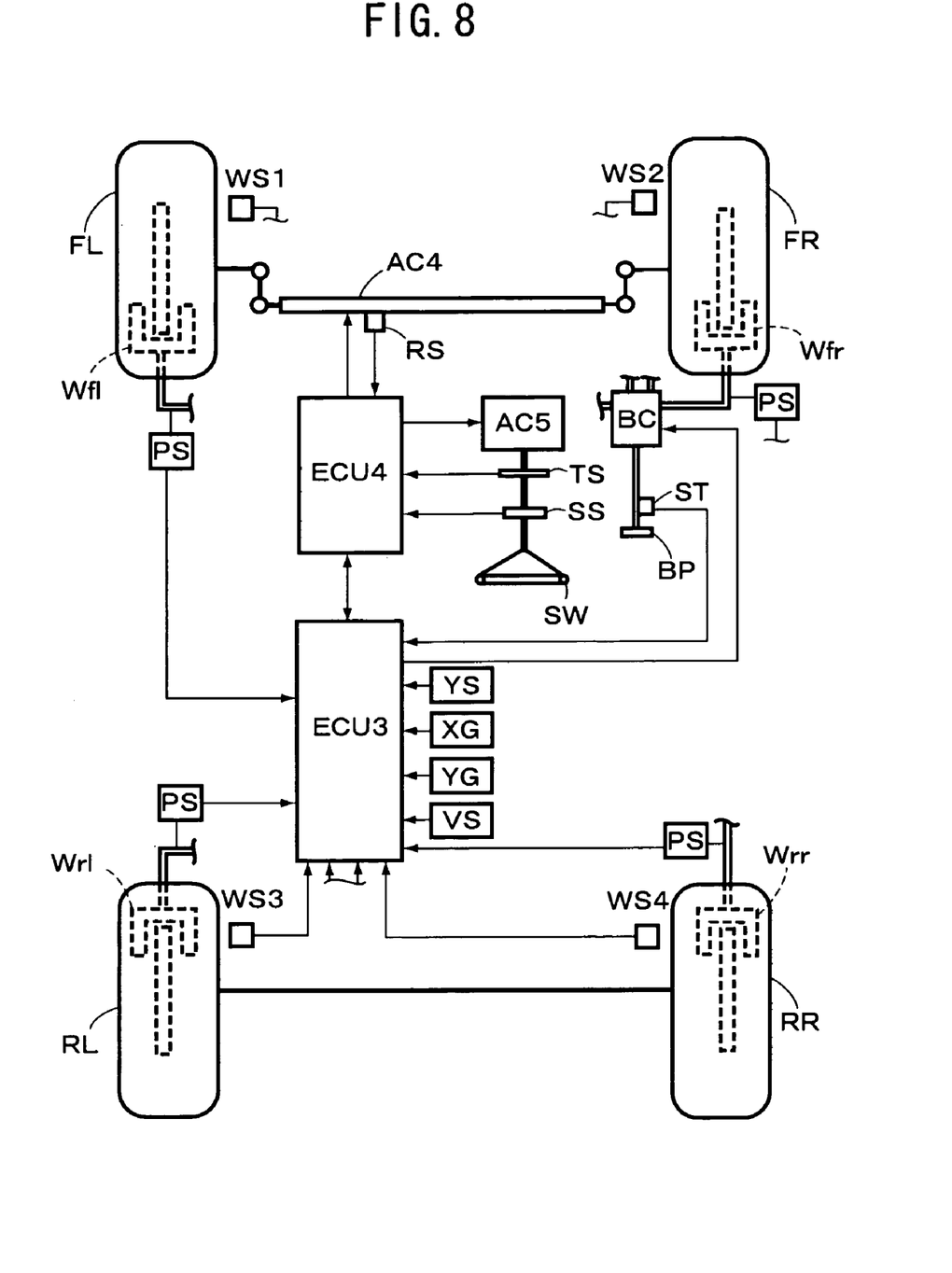
FIG. 8 is a schematic block diagram showing a steering control apparatus according to another embodiment of the present invention.
Figure 9:
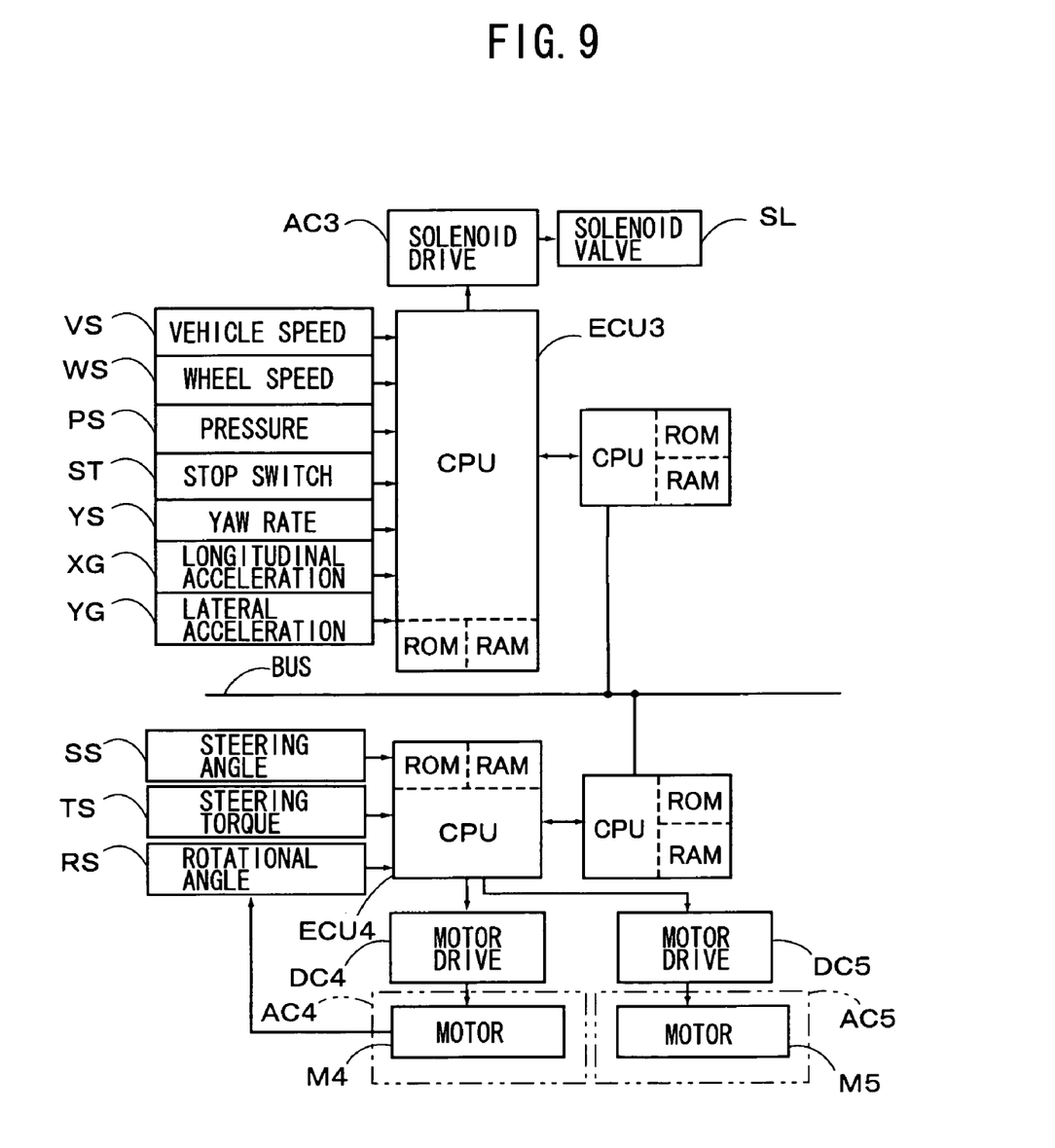
FIG. 9 is a block diagram showing an embodiment of a steering control system according to another embodiment of the present invention.

FIGS. 8 and 9 show another embodiment of the present invention, wherein the steering control system is constituted by a so-called steer-by-wire system, and performs the electric power steering function and the active steering function as described before, and is provided with an actuator AC4 similar to the actuator AC1 as shown in FIG. 1. The steering angle detected by the steering angle sensor SS in response to operation of the steering wheel SW by the vehicle driver, and the steering torque detected by the steering torque sensor TS are fed to the steering control unit ECU4. On the basis of those signals and the vehicle state signals (vehicle speed or the like), electric current is provided for actuating the motor (M4 in FIG. 9) in the actuator AC4, to control the steered wheel angle (tire angle) of the front wheels FL and FR. In order to apply a steering reaction force to the operation of the steering wheel SW, there is provided a reaction actuator AC5 having the motor (M5 in FIG. 9). The braking control system and the like of the present embodiment are substantially the same as those of the embodiment as shown FIGS. 1 and 2, the explanation of them is omitted herein, with the same reference numerals given to substantially the same elements as shown in FIGS. 1 and 2. However, a steering control unit ECU4 is different from the steering control unit ECU1 as shown FIG. 3.

Figure 10:
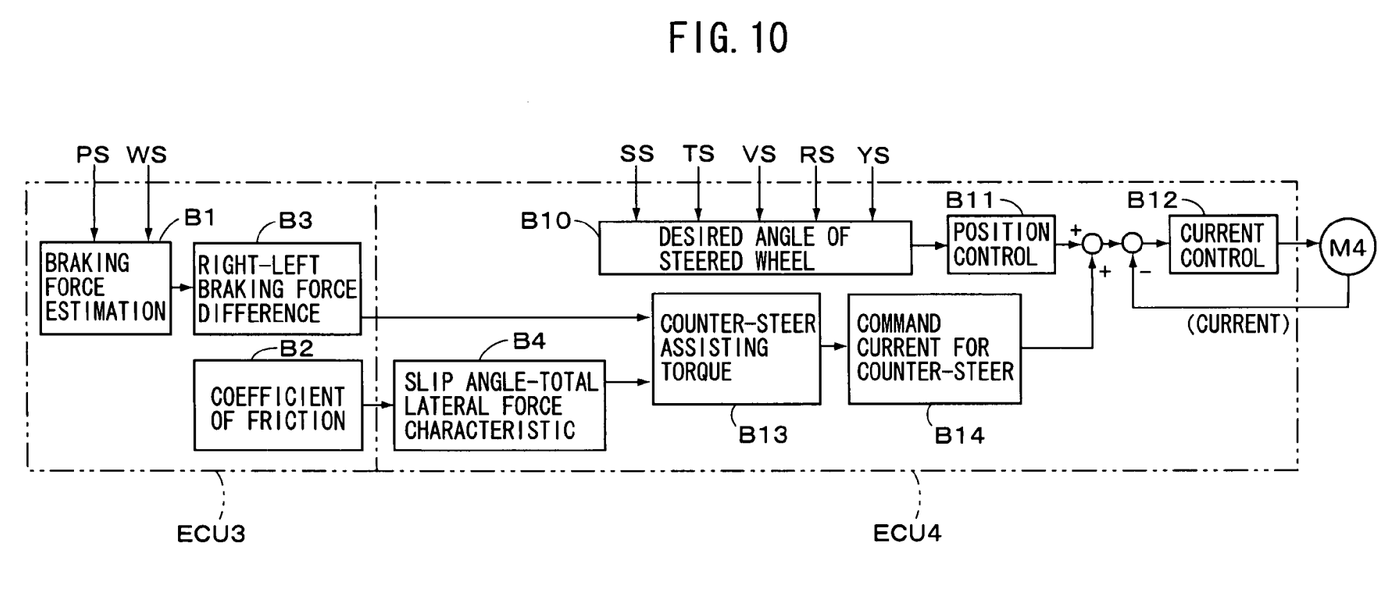
FIG. 10 is a block diagram showing an embodiment of a steering control system including an active counter-steer control according to another embodiment of the present invention.

As shown in FIG. 10, the steering control unit ECU4 has a block (B10) which includes the blocks (B5) and (B6) as shown in FIG. 3, while it may be constituted in the same structure as shown in FIG. 3. With respect to the blocks following it, the present embodiment includes a block (B11) for performing a position feedback control to make a deviation between the desired value and the actual value for the steered angle is controlled to be zero, and a block (B12) for performing a current feedback control to achieve a torque control for obtaining the required output of steering torque. Then, it is so constituted that the current command value for performing the desired steering control with respect to the electric motor M4 is added by the current command value for performing the counter-steer, which is calculated as follows. At the outset, a counter-steer assisting steering torque (τct) is calculated at a block (B13), and converted into the current command value for performing the counter-steer at a block (B14). According to the present embodiment, the counter-steer assisting steering torque (τct) is calculated not only on the basis of the braking force difference between the right and left wheels (or, coefficient of friction difference), but also on the basis of the property of fαc(Fy) (=α) which reflects the relationship of the braking force actually applied to each wheel (or, coefficient of friction to each wheel), according to an equation (5) as follows:

$$\tau ct = Kb \cdot f\alpha c(Fy) + Kb \cdot (d\, f\alpha c(Fy)/dt) \cdot Kc \qquad (5)$$

where "Kb" is a efficiency for converting angle to torque, "Kc" is a differential gain, and (d fαc(Fy)/dt) is a time-variation of α(=fαc(Fy)).

In the equation (5), the second paragraph is provided for improving its responsibility, and may be omitted.

According to the equation (5), therefore, a practical embodiment is provided for the aforementioned embodiment for calculating the total lateral force (Fy) required for the steered wheels to cancel the moment about the gravity center of the vehicle caused by the braking force difference between the right and left wheels, and the slip angle obtained by applying the total lateral force (Fy) to the relationship (fαc(Fy)) between the slip angle and the total lateral force for the steered wheels, is multiplied by a proportional gain (Kb) to be set as the steering torque (τct).

Also, the equation (5) may be constituted as the one including the vehicle slip angle (β) as in the equation (3), therefore, to provide the embodiment for calculating the total lateral force required for the steered wheels to cancel the moment about the gravity center of the vehicle caused by the braking force difference between the right and left wheels, and the steered wheel angle is calculated on the basis of the dynamic relationship among the wheel slip angle, vehicle slip angle, vehicle speed and yaw rate obtained by applying the total lateral force to the relationship between the slip angle and the total lateral force for the steered wheels, and then multiplied by the proportional gain to be set as the steering torque.

Figure 11:
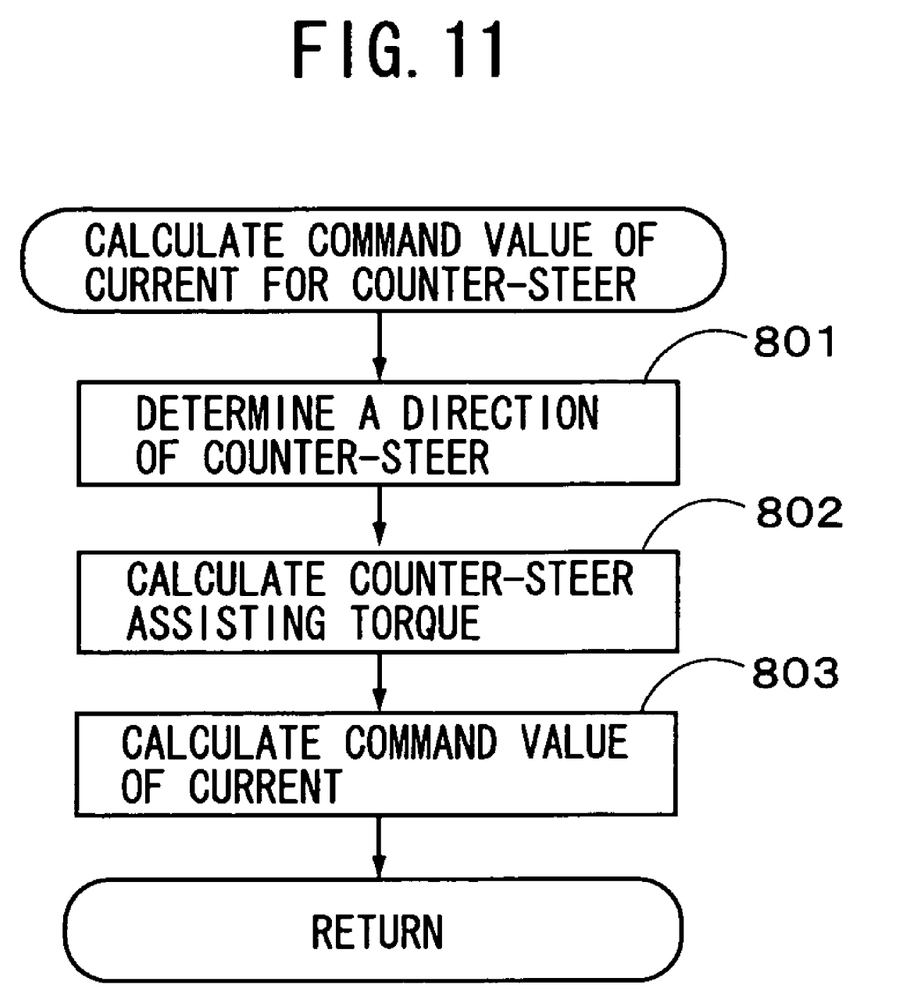
FIG. 11 is a flowchart showing operation of calculating a counter-steer assisting torque at the time of an active counter-steer control according to another embodiment of the present invention.

According to the embodiment as constituted above, when the active counter control is performed during the braking control, the current command value for performing the counter-steer assisting control, instead of Step 600 in the flowchart as shown in FIG. 6. The remaining steps are substantially the same as those in FIG. 6, so that the explanation of them are omitted herein. The current command value for performing the counter-steer assisting control is calculated according to the flowchart as shown in FIG. 11. At the outset, the counter-steer direction is determined at Step 801, and the counter-steer assisting steering torque (τct) is obtained at Step 802 according to the equation of [τct=Kb·fαc(Fy)+Kb·(d fαc(Fy)/dt)·Kc], as described before. That is, the counter-steer assisting steering torque (τct) is appropriately calculated not only on the basis of the braking force difference between the right and left wheels (or, coefficient of friction difference), but also on the basis of the property of fαc(Fy) which reflects the relationship of the braking force actually applied to each wheel (or, coefficient of friction to each wheel). Then, the program proceeds to Step 803, where the current command value for performing the counter-steer assisting control with respect to the electric motor M4 is calculated on the basis of the counter-steer assisting steering torque (τct) as obtained above.

The embodiment for actively controlling the steered wheel angle as shown in FIG. 1 and the embodiment for controlling the assisting torque as shown in FIG. 8 may be applied together. However, if one of them is performed, it will sufficiently assist the counter-steer operation performed during a μ-cross over braking operation in each embodiment. According to the embodiment as constituted above, therefore, more appropriate wheel angle or assisting torque may be applied, to improve the vehicle stability during the μ-cross over braking operation. The embodiments as described above relate to the active front steering control system for the front steered wheels, while the present invention is applicable to the active rear steering control system for the rear steered wheels, and also applicable to a vehicle having both of the steering control systems.

It should be apparent to one skilled in the art that the above-described embodiment are merely illustrative of but a few of the many possible specific embodiments of the present invention. Numerous and various other arrangements can be readily devised by those skilled in the art without departing from the spirit and scope of the invention as defined in the following claims.

What is claimed is:

1. A steering control apparatus for a vehicle, comprising:
   steering control means for controlling a steered wheel angle of a wheel to be steered in response to steering operation of a vehicle driver;
   braking force estimation means for estimating a braking force applied to at least a pair of right and left wheels of said vehicle, respectively;
   coefficient of friction estimation means for estimating a coefficient of friction of road surface, on which each of said right and left wheels is placed;
   braking force difference calculation means for calculating a braking force difference between the braking force applied to said right wheel and the braking force applied to said left wheel, on the basis of the braking force estimated by said braking force estimation means;
   slip angle—total lateral force characteristic setting means for setting a relationship between a slip angle of said wheel to be steered, and a total lateral force of said wheel to be steered, on the basis of the coefficient of friction estimated by said coefficient of friction estimation means; and
   steered wheel angle setting means for setting the steered wheel angle of said wheel to be steered, on the basis of the braking force difference between said right and left wheels calculated by said calculation means, and the relationship between the slip angle of said wheel to be steered and the total lateral force of said wheel to be steered, said relationship being set by said characteristic setting means.

2. The steering control apparatus according to claim 1, wherein said characteristic setting means estimates a relationship between the slip angle and the lateral force for each wheel of said right and left wheels, which are placed on the road surface with the coefficient of friction estimated by said coefficient of friction estimation means, on the basis of a relationship between the slip angle and the lateral force for each wheel of said right and left wheels, which are placed on a road surface with a certain coefficient of friction, and add the result estimated for said right and left wheels, to provide the relationship between the slip angle and the total lateral force of said wheel to be steered.

3. The steering control apparatus according to claim 1, wherein said steered wheel angle setting means calculates the total lateral force of said wheel to be steered, which is required for canceling a moment about a gravity center of said vehicle, said moment being caused by the braking force difference calculated by said braking force difference calculation means, and said steered wheel angle setting means applies the calculated total lateral force to the relationship between the slip angle of said wheel to be steered and the total lateral force of said wheel to be steered, to obtain a slip angle, which is provided as the steered wheel angle of said wheel to be steered.

4. The steering control apparatus according to claim 3, wherein if the required total lateral force of said wheel to be steered exceeds saturated lateral force corresponding to the slip angle in the relationship between the slip angle of said wheel to be steered and the total lateral force of said wheel to be steered, the slip angle corresponding to the saturated lateral force is set as a desired slip angle to be used.

5. The steering control apparatus according to claim 1, wherein said steered wheel angle setting means calculates the total lateral force of said wheel to be steered, which is required for canceling a moment about a gravity center of said vehicle, said moment being caused by the braking force difference calculated by said braking force difference calculation means, and said steered wheel angle setting means applies the calculated total lateral force to the relationship between the slip angle of said wheel to be steered and the total lateral force of said wheel to be steered, to obtain a dynamic relationship among the slip angle, vehicle slip angle, vehicle speed and yaw rate, and wherein said steered wheel angle setting means calculates the steered wheel angle on the basis of said dynamic relationship.

6. The steering control apparatus according to claim 5, wherein if the required total lateral force of said wheel to be steered exceeds saturated lateral force corresponding to the slip angle in the relationship between the slip angle of said wheel to be steered and the total lateral force of said wheel to be steered, the slip angle corresponding to the saturated lateral force is set as a desired slip angle to be used.

7. A steering control apparatus for a vehicle, comprising:
   steering torque applying means for applying a steering torque to a wheel to be steered in response to steering operation of a vehicle driver;

braking force estimation means for estimating braking force applied to at least a pair of right and left wheels of said vehicle, respectively;

coefficient of friction estimation means for estimating a coefficient of friction of road surface, on which each of said right and left wheels is placed;

braking force difference calculation means for calculating a braking force difference between the braking force applied to said right wheel and the braking force applied to said left wheel, on the basis of the braking force estimated by said braking force estimation means;

slip angle—total lateral force characteristic setting means for setting a relationship between a slip angle of said wheel to be steered, and a total lateral force of said wheel to be steered, on the basis of the coefficient of friction estimated by said coefficient of friction estimation means; and steering torque setting means for setting the steering torque of said wheel to be steered, on the basis of the braking force difference between said right and left wheels calculated by said calculation means, and the relationship between the slip angle of said wheel to be steered and the total lateral force of said wheel to be steered, said relationship being set by said characteristic setting means.

8. The steering control apparatus according to claim 7, wherein said characteristic setting means estimates a relationship between the slip angle and the lateral force for each wheel of said right and left wheels, which are placed on the road surface with the coefficient of friction estimated by said coefficient of friction estimation means, on the basis of a relationship between the slip angle and the lateral force for each wheel of said right and left wheels, which are placed on a road surface with a certain coefficient of friction, and add the result estimated for said right and left wheels, to provide the relationship between the slip angle and the total lateral force of said wheel to be steered.

9. The steering control apparatus according to claim 7, wherein said steering torque setting means calculates the total lateral force of said wheel to be steered, which is required for canceling a moment about a gravity center of said vehicle, said moment being caused by the braking force difference calculated by said braking force difference calculation means, and said steered wheel angle setting means applies the calculated total lateral force to the relationship between the slip angle of said wheel to be steered and the total lateral force of said wheel to be steered, to obtain a slip angle, which is multiplied by a proportional coefficient to provide the steering torque for said wheel to be steered.

10. The steering control apparatus according to claim 9, wherein if the required total lateral force of said wheel to be steered exceeds saturated lateral force corresponding to the slip angle in the relationship between the slip angle of said wheel to be steered and the total lateral force of said wheel to be steered, the slip angle corresponding to the saturated lateral force is set as a desired slip angle to be used.

11. The steering control apparatus according to claim 7, wherein said steering torque setting means calculates the total lateral force of said wheel to be steered, which is required for canceling a moment about a gravity center of said vehicle, said moment being caused by the braking force difference calculated by said braking force difference calculation means, and said steered wheel angle setting means applies the calculated total lateral force to the relationship between the slip angle of said wheel to be steered and the total lateral force of said wheel to be steered, to obtain a dynamic relationship among the slip angle, vehicle slip angle, vehicle speed and yaw rate, and wherein said steering torque setting means calculates the steered wheel angle on the basis of said dynamic relationship, and multiplies the steered wheel angle by a proportional coefficient to provide the steering torque for said wheel to be steered.

* * * * *